United States Patent
Wu et al.

(10) Patent No.: US 6,908,708 B2
(45) Date of Patent: Jun. 21, 2005

(54) METHOD OF PREPARING LAYERED LITHIUM-CHROMIUM-MANGANESE OXIDES FOR LITHIUM BATTERIES

(75) Inventors: Xianglan Wu, Daejeon (KR); Yong Joon Park, Daejeon (KR); Kwang Sun Ryu, Daejeon (KR); Soon Ho Chang, Daejeon (KR); Young-Sik Hong, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 101 days.

(21) Appl. No.: 10/648,614

(22) Filed: Aug. 25, 2003

(65) Prior Publication Data

US 2004/0105809 A1 Jun. 3, 2004

(30) Foreign Application Priority Data

Nov. 29, 2002 (KR) ................ 10-2002-0075395

(51) Int. Cl.$^7$ .......................... H01M 4/50; H01M 4/58; C01G 37/14; C01G 45/12; C01D 15/00
(52) U.S. Cl. ............... 429/224; 429/231.5; 429/231.95; 423/596; 423/599; 423/179.5; 502/319; 502/324
(58) Field of Search ............... 502/319, 324; 423/596, 599, 605, 607, 179.5, 592; 429/224, 231.5, 231.95

(56) References Cited

U.S. PATENT DOCUMENTS

| | | | | |
|---|---|---|---|---|
| 5,478,674 A | * | 12/1995 | Miyasaka | 429/231.3 |
| 5,571,637 A | * | 11/1996 | Idota | 429/338 |
| 5,686,203 A | * | 11/1997 | Idota et al. | 429/342 |
| 5,742,070 A | * | 4/1998 | Hayashi et al. | 252/182.1 |
| 5,858,324 A | | 1/1999 | Dahn et al. | |
| 5,900,385 A | * | 5/1999 | Dahn et al. | 502/302 |
| 5,985,488 A | * | 11/1999 | Mitate et al. | 429/223 |
| 6,344,294 B1 | * | 2/2002 | Torata et al. | 429/223 |
| 6,361,755 B1 | * | 3/2002 | Manthiram et al. | 423/599 |
| 6,613,476 B2 | * | 9/2003 | Cho et al. | 429/224 |
| 6,680,143 B2 | * | 1/2004 | Thackeray et al. | 429/224 |
| 6,753,110 B1 | * | 6/2004 | Yoo et al. | 429/231.95 |

FOREIGN PATENT DOCUMENTS

| | | |
|---|---|---|
| KR | 1999-0047338 | 7/1999 |
| KR | 2000-0051649 | 8/2000 |
| KR | 2002-0029218 | 4/2002 |
| KR | 10-0354224 | 9/2002 |

OTHER PUBLICATIONS

Journal of the Electrochemical Society, 149 (11), pp. A1454–A1459.

* cited by examiner

*Primary Examiner*—Cam N. Nguyen
(74) *Attorney, Agent, or Firm*—Blakely Sokoloff Taylor & Zafman

(57) ABSTRACT

A method of preparing layered lithium-chromium-manganese oxides having the formula $Li[Cr_xLi_{(1/3-x/3)}Mn_{(2/3-2x/3)}]O_2$ where $0.1 \leq X \leq 0.5$ for lithium batteries. Homogeneous precipitation is prepared by adding lithium hydroxide (LiOH) solution to a mixed solution of chromium acetate $(Cr_3(OH)_2(CH_3CO_2)_7)$ and manganese acetate $((CH_3CO_2)_2Mn \cdot 4H_2O)$, while precursor powders are prepared by firing the precipitation. After that, the precursor powders are subjected to two heat treatment to yield $Li[Cr_xLi_{(1/3-x/3)}Mn_{(2/3-2x/3)}]O_2$ with $\alpha$-LiFeO$_2$ structure.

8 Claims, 3 Drawing Sheets

METHOD OF PREPARING LAYERED LITHIUM-CHROMIUM-MANGANESE OXIDES FOR LITHIUM BATTERIES

BACKGROUND OF THE INVENTION

This application claims the priority of Korean Patent Application No. 2002-75395, filed on Nov. 29, 2002 in the Korean Intellectual Property Office. The disclosure herein is incorporated in the above reference entirely.

1. Field of the Invention

The present invention relates to syntheses of cathode materials for lithium batteries, particularly, a method of preparing lithium-chromium-manganese oxides having $\alpha$-LiFeO$_2$ structure.

2. Description of the Related Art

There have been reports on layered lithium-chromium-manganese oxides (Li$_y$Cr$_x$Mn$_{2-x}$O$_{4+z}$) as disclosed in U.S. Pat. No. 5,858,324. Conventionally, layered lithium-chromium-manganese oxides were calcined under argon (Ar) or nitrogen gas (N$_2$) atmosphere that will raise the manufacturing cost. In addition, the material prepared by the conventional method exhibited 120 to 190 mAh/g capacity with relatively poor cycling retention. Recently, J. R. Dahn et al. reported novel lithium-chromium-manganese oxides, [Li[Cr$_x$Li$_{(1/3-x/3)}$Mn$_{(2/3-2x/3)}$]O$_2$ (00.0$\leq$X$\leq$1.0) with $\alpha$-LiFeO$_2$ structure, give a stable capacity of about 200 mAh/g in the *Journal of the Electrochemical Society*, 149 (11), A1454–A1459, 2002.

In order to synthesize the above-described oxide, Dahn et al. dissolved lithium salts, manganese salts, and chromium salts in distilled water and dropped ammonia solution (NH$_4$OH) until the pH of the solution becomes 10 and the precipitation completes. After that, the precipitation was put in a muffle oven and dried in air at 130° C. overnight. The dried precipitate was heated in air at 480° C. for 12 hours. Then the resultant powder was pressed into pellets and calcined under argon (Ar) atmosphere at 900° C. for 3 hours.

According to the above method, a stabilized layered lithium-chromium-manganese oxide could be obtained. However, it requires tedious pH adjusting process, overnight oven treatment, argon (Ar) atmosphere that raises manufacturing cost.

SUMMARY OF THE INVENTION

This invention features preparing lithium-chromium-manganeseoxides having excellent discharge capacity and cyclability at low cost. This invention also features simple and cheap manufacturing processes for lithium-chromium-manganese oxides useful as cathode materials for lithium batteries.

According to an aspect of the present invention, a method of preparing lithium-chromium-manganese oxides for lithium batteries is provided. Homogeneous precipitation solution is obtained by adding lithium hydroxide (LiOH) solution to the mixed solution of chromium acetate (Cr$_3$(OH)$_2$(CH$_3$CO$_2$)$_7$) and manganese acetate ((CH$_3$CO$_2$)$_2$Mn.4H$_2$O) with stirring. Precursor powders having the formula Li[Cr$_x$Li$_{(1/3-x/3)}$Mn$_{(2/3-2x/3)}$]O$_2$ where (0.1$\leq$X$\leq$0.5) are obtained by firing the homogeneous precipitation, while layered oxides obtained by annealing the precursor powders at high temperature.

In order to obtain precursor powder, the homogeneous precipitation solution is heated until it become a viscous inorganic polymer. Then, the viscous inorganic polymer is coated on a titanium foil and heated on a hot plate until it became a porous powder.

In order to obtain layered oxide powders, the precursor powders are subjected to two consecutive heat treatments. The first one is performed in the temperature range of 650 to 700° C. Then the resultant powders are ground and subjected to the second heat treatment in the range of 900 to 1000° C. in air. After the second annealing process, the oxide powders are quenched to room temperature.

According to this invention, layered lithium-chromium-manganese oxides can be mass-produced at low cost. In addition, as prepared lithium-chromium-manganese oxides exhibit excellent discharge capacity and cyclability when they are used as cathode materials for lithium batteries.

BRIEF DESCRIPTION OF THE DRAWINGS

The above aspects and advantages of the present invention will become more apparent by describing in detail a preferred embodiment thereof with reference to the attached drawings in which.

DETAILED DESCRIPTION OF THE INVENTION

The present invention will now be described in detail using the accompanying drawings, in which a preferred embodiment of the invention is shown.

Figure 1:
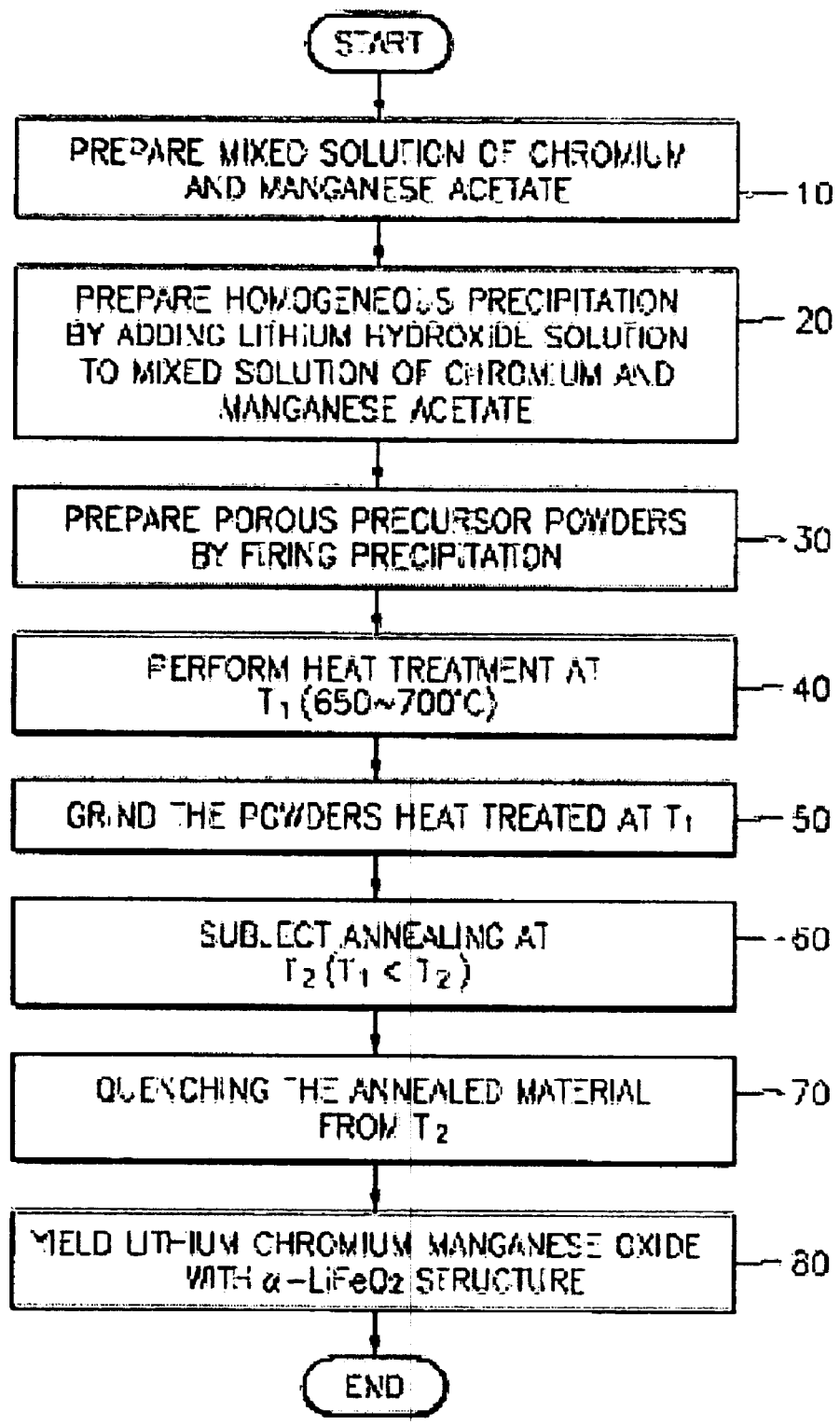
FIG. 1 is a flowchart explaining the preparing processes of lithium-chromium-manganese oxides ascribed in the present invention.

FIG. 1 is a flowchart explaining the preparing processes of lithium-chromium-manganese oxides ascribed in the present invention.

As shown in FIG. 1, mixed solution of chrome acetate (Cr$_3$(OH)$_2$(CH$_3$CO$_2$)$_7$) and manganese acetate ((CH$_3$CO$_2$)$_2$Mn.4H$_2$O) is prepared by dissolving stoichiometric amounts of chromium acetate hydroxide (Cr$_3$(OH)$_2$(CH$_3$CO$_2$)$_7$) and manganese acetate tetrahydrate ((CH$_3$CO$_2$)$_2$ Mn.4H$_2$O) in distilled water (step 10).

To obtain homogeneous precipitation, stoichiometric amount of lithium hydroxide (LiOH) solution is added to the above mixed transition metal solution with stirring (step 20). The relative amounts of chromium acetate hydroxide (Cr$_3$(OH)$_2$(CH$_3$CO$_2$)$_7$), manganese acetate tetrahydrate ((CH$_3$CO$_2$)$_2$Mn.4H$_2$O), and Lithium hydroxide (LiOH) are selected to yield a compound having the formula Li[Cr$_x$Li$_{(1/3-x/3)}$Mn$_{(2/3-2x/3)}$]O$_2$, disclosed by J. R. Dahn et al. in the *Journal of the Electrochemical Society* 149(11), A1454–A1459, 2002, where 0.1$\leq$X$\leq$0.5, and preferably 0.1$\leq$x$\leq$0.2. In case of x<0.1, layered structure with orthorhombic phase tends to occur and the discharge proceeds with two step voltage profiles, whereas when x>0.5, the discharge capacity of the compound decreases with the increase of x.

The precipitation solution in step 20 is fired to produce porous precursor powders (step 30). In detail, the precipitation solution is heated on a hot plate until it become a viscous inorganic polymer. Then, the viscous inorganic polymer is coated on a titanium foil and heated on a hot plate until it became porous powders. The porosity is attributed to the decomposition of acetate (—COOH) group embodied in the viscous inorganic polymer.

The precursor oxide powders obtained in step 30 are subjected to first heat treatment at $T_1$ temperature, which is selected from 650 to 700° C., for about 3 hours (step 40). Through the pre-firing process, organic compositions are completely removed from the precursor powders and the oxides begin to yield layered structures.

The pre-fired oxide powders are ground to fine powders (step 50). Then, the resultant powders are annealed at $T_2$ temperature, which is selected from 900 to 1000° C. (step 60). After annealing more than 12 hours in air, the powders are quenched (step 70). Through the annealing treatment at high temperature, the oxide powders exhibit a perfect layer with $\alpha$-LiFeO$_2$ structure.

Herein, a synthesis example of layered lithium-chromium-manganese oxides is described according to the present invention.

[Synthesis]

Stoichiometric amount of chromium acetate hydroxide (Cr$_3$(OH)$_2$(CH$_3$CO$_2$)$_7$), manganese acetate tetrahydrate ((CH$_3$CO$_2$)$_2$Mn.4H$_2$O), and lithium hydroxide (LiOH) are dissolved in distilled water, respectively. The relative amount of the above reagents is as follows.

(1) For Li$_{1.27}$Cr$_{0.20}$Mn$_{0.53}$O$_2$, 10.84 g LiOH, 26.39 g (CH$_3$CO$_2$)$_2$Mn.4H$_{Cr3}$(OH)$_2$(CH$_3$CO$_2$)$_7$ is used.

(2) For Li$_{1.28}$Cr$_{0.15}$Mn$_{0.57}$O$_2$, 10.96 g LiOH, 28.22 g (CH$_3$CO$_2$)$_2$Mn.4H$_{Cr3}$(OH)$_2$(CH$_3$CO$_2$)$_7$ is used.

(3) For Li$_{1.30}$Cr$_{0.10}$Mn$_{0.60}$O$_2$, 11.13 g LiOH, 29.71 g (CH$_3$CO$_2$)$_2$Mn.4H$_{Cr3}$(OH)$_2$(CH$_3$CO$_2$)$_7$ is used.

Sufficient amount of distilled water is used to dissolve the reagents. In the above case, around 70 ml of distilled water is used to dissolve lithium hydroxide (LiOH), while around 60 ml of distilled water is used to dissolve chromium acetate hydroxide and manganese acetate tetrahydrate. Then, lithium hydroxide (LiOH) solution is added to the mixed solution of chromium acetate and the manganese acetate with stirring. This results in a homogeneous precipitation solution.

The homogeneous precipitation solution is heated until it become viscous inorganic polymer. The resultant inorganic polymer is coated on a titanium foil and heated on a hot plate until it became porous powders. The porosity of the powders is attributed to the decomposition reaction of acetate (—COOH) group embodied in the viscous inorganic polymer. Then, the precursor powders are fired at 700° C. for 3 hours. After ground, the resultant powders are calcined at 900° C. at least for 12 hours in air and then quenched to room temperature.

Figure 2:
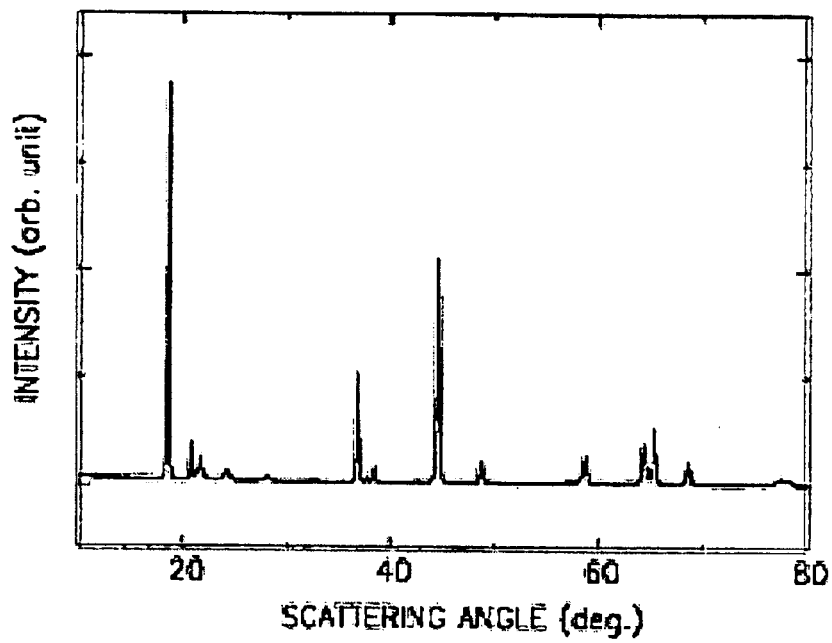
FIG. 2 is a power X-ray diffraction (XRD) pattern of lithium-chromium-manganese oxide prepared according to the present invention.

FIG. 2 is a power X-ray diffraction (XRD) pattern of Li$_{1.27}$Cr$_{0.20}$Mn$_{0.53}$O$_2$ prepared according to the above example. As shown in FIG. 2, the XRD pattern is corresponding to that of Li[Cr$_x$Li$_{(1/3-2x/3)}$Mn$_{(2/3-2x/3)}$]O$_2$ where x=1/3, which is prepared by a conventional method.

Figure 3:
FIG. 3 is a scanning electron microscopy (SEM) image of lithium-chromium-manganese oxide prepared according to the present invention.

FIG. 3 is a scanning electron microscopy (SEM) image of Li$_{1.27}$Cr$_{0.20}$Mn$_{0.53}$O$_2$ prepared according to the above example. As shown in FIG. 3, particles of the oxide exhibit equiaxed hexagonal shapes with well-developed crystal faces.

Figure 4:
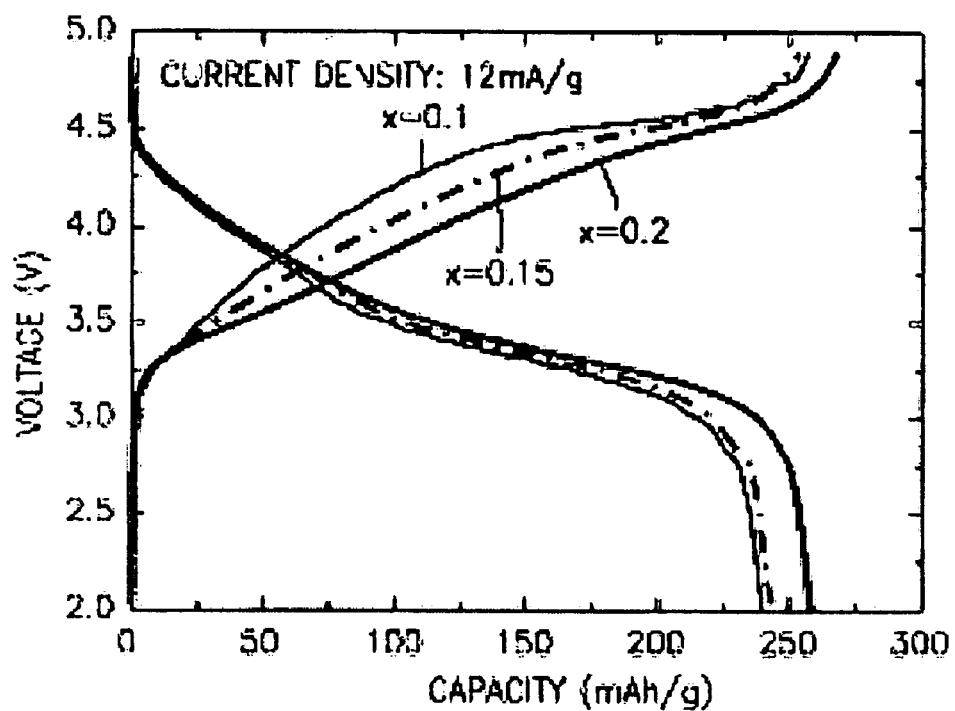
FIG. 4 is a series of typical charge-discharge curves for lithium-chromium-manganese oxides prepared according to the present invention.

FIG. 4 is a series of typical charge-discharge curves for lithium-chromium-manganese oxides prepared according to the above example. Here, cathodes are prepared by mixing oxide powders, conductor, and binder in a ratio of 85:7.5:7.5 by weight, while anodes are prepared by cutting lithium foil. Before fabricating lithium cells, cathodes are pressed into an appropriate thickness in a roll press. Electrolyte is 1 M LiPF$_6$ dissolved in 1:1 ethylene carbonate (EC) and dimethyl carbonate (DMC).

Figure 5:
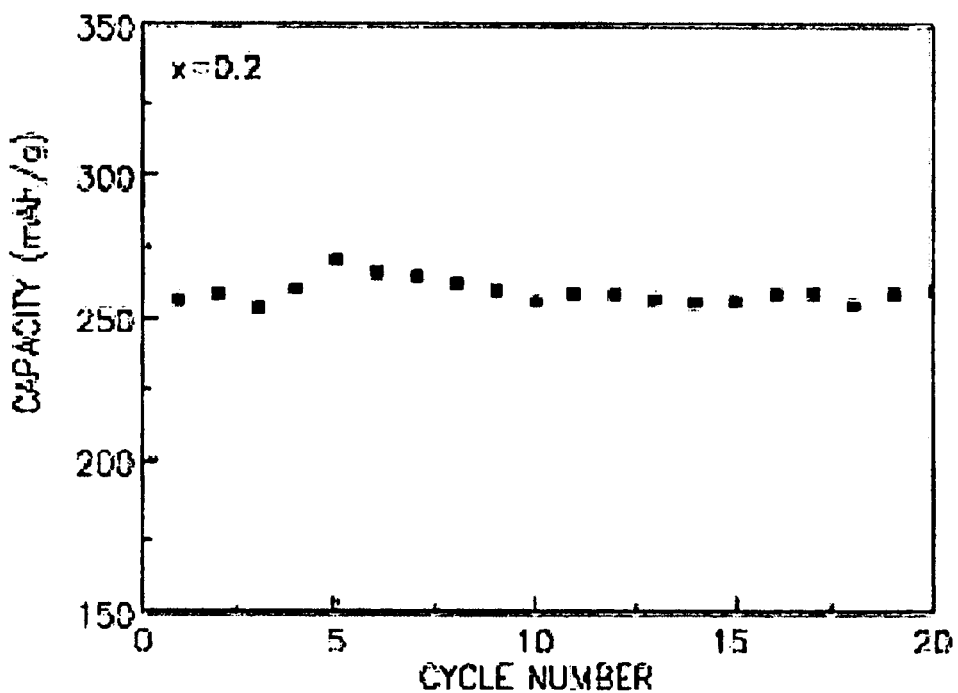
FIG. 5 is a cycling behavior of lithium-chromium-manganese oxide prepared according to the present invention.

FIG. 5 shows cycling behavior of the cell fabricated using Li$_{1.27}$Cr$_{0.20}$Mn$_{0.53}$O$_2$ powders prepared according to the above example. The cell is cycled with the current density of 12 mA/g between 2.0 to 4.9 V. The cell exhibits a capacity of 258 mAh/g in the initial discharge and sustains around 260 mAh/g capacity even after 20 cycles. It is clear that both the capacity and cycling behavior of Li$_{1.27}$Cr$_{0.20}$Mn$_{0.53}$O$_2$ prepared according to the above example are better than that of the lithium-chromium-manganese oxides prepared using conventional method.

According to the present invention, layered lithium-chromium-manganese oxides useful as cathode materials for lithium batteries are prepared by quenching. In detail, lithium hydroxide (LiOH) solution is added to the mixed solution of chromium acetate (Cr$_3$(OH)$_2$(CH$_3$CO$_2$)$_7$) and manganese acetate ((CH$_3$CO$_2$)$_2$Mn.4H$_2$O) with stirring until it becomes a homogeneous precipitation. The precipitation solution is heated to give porous precursor powders. Then the porous powders are annealed at high temperature in air and then quenched to room temperature to yield layered materials with the formula Li[Cr$_x$Li$_{(1/3-x/3)}$Mn$_{(2/3-2x/3)}$]O$_2$ where $0.1 \leq X \leq 0.5$.

According to the present invention, the structure of $\alpha$-LiFeO$_2$ lithium-chromium-manganese oxide is different from that of layered LiMnO$_2$ or spinel LiMn$_2$O$_4$. In addition, the preparation process is simple and cheaper than that of the previously reported method that requires tedious pH adjustment, overnight precipitation drying, and heat treatment under expensive argon (Ar) gas. Indeed, in this invention, the precipitation is obtained by adding stoichiometric amount of lithium hydroxidesolution to the mixed solution of manganese and chromium acetate with stirring simply, while the porous precursor powders are prepared by firing the viscous precipitations embodying acetate group (—COOH) on titanium foil directly. Specially, the porous powders are annealed at 900° C. for more than 12 hours in air and then quenched to room temperature instead of annealing under inert gas. Consequently, layered lithium-chromium-manganese oxides having excellent discharge capacity and cycling retention could be mass-produced at low cost.

This invention has been described with reference to a preferred embodiment, however, it will be understood that additional modifications and applications may be made within the scope thereof by those skilled in the art.

What is claimed is:

1. A method of preparing layered lithium-chromium-manganese oxides for lithium batteries, comprising the steps of:

preparing a homogeneous precipitation by adding lithium hydroxide (LiOH) solution to a mixed solution of chromium acetate (Cr$_3$(OH)$_2$(CH$_3$CO$_2$)$_7$) and manganese acetate ((CH$_3$CO$_2$)$_2$Mn.4H$_2$O);

preparing precursor powders having the formula Li[Cr$_x$Li$_{(1/3-x/3)}$Mn$_{(2/3-2x/3)}$]O$_2$ where $0.1 \leq X \leq 0.5$ by firing the homogeneous precipitation; and preparing layered oxide powders by heat treating the precursor powders.

2. The method as claimed in claim 1, wherein the preparation of the precursor powder comprises:

heating the homogeneous precipitation to remove excess water; and firing the homogeneous precipitation by heating the homogeneous precipitation on a hot plate.

3. The method as claimed in claim 2, wherein the firing of the homogeneous precipitation on a hot plate is performed after the viscous precipitation is coated on titanium foil.

4. The method as claimed in claim 1, wherein the heat treatment of the precursor powders comprises:

firing at a temperature $T_1$, which is in the range of 650 to 700° C.; and annealing at a temperature $T_2$ which is higher than $T_1$ temperature.

5. The method as claimed in claim 4, wherein the temperature $T_2$ is in the range of 900 to 1000° C.

6. The method as claimed in claim 4, further comprising grinding the precursor powders fired at temperature $T_1$ before annealing at temperature $T_2$.

7. The method as claimed in claim 4, wherein the annealing at temperature $T_2$ is performed in air.

8. The method as claimed in claim 4, further comprising quenching the precursor powders annealed at temperature $T_2$.

* * * * *